United States Patent
John et al.

(10) Patent No.: US 9,725,177 B2
(45) Date of Patent: Aug. 8, 2017

(54) PNEUMATIC COMFORT SEATS

(71) Applicant: AMI Industries, Inc., Colorado Springs, CO (US)

(72) Inventors: Poly Puthur John, Karnataka (IN); S. Shyam Sundar Iyer, Karnataka (IN); Manjunatha Prabhudevaiah, Karnataka (IN)

(73) Assignee: AMI INDUSTRIES, INC., Colorado Springs, CO (US)

(*) Notice: Subject to any disclaimer, the term of this patent is extended or adjusted under 35 U.S.C. 154(b) by 0 days.

(21) Appl. No.: 15/050,866

(22) Filed: Feb. 23, 2016

(65) Prior Publication Data

US 2017/0106982 A1 Apr. 20, 2017

(30) Foreign Application Priority Data

Oct. 20, 2015 (IN) .......................... 5654/CHE/2015

(51) Int. Cl.
*A47C 7/14* (2006.01)
*B64D 11/06* (2006.01)

(52) U.S. Cl.
CPC ............................. *B64D 11/0647* (2014.12)

(58) Field of Classification Search
CPC ................................................. B64D 11/0647
USPC ................................................... 297/452.41
See application file for complete search history.

(56) References Cited

U.S. PATENT DOCUMENTS

| | | | |
|---|---|---|---|
| 2,350,711 A | 6/1944 | Amos | |
| 4,444,430 A | 4/1984 | Yoshida et al. | |
| 4,595,374 A | 6/1986 | Wass | |
| 4,619,285 A | 10/1986 | Piet | |
| 4,852,195 A | 8/1989 | Schulman | |
| 5,558,398 A | 9/1996 | Santos | |
| 5,921,832 A | 7/1999 | Thiermann | |
| 6,036,271 A * | 3/2000 | Wilkinson | ........... A61G 5/1043 297/452.41 X |

(Continued)

FOREIGN PATENT DOCUMENTS

| | | |
|---|---|---|
| WO | 9841126 | 9/1998 |
| WO | 2006023479 | 3/2006 |

OTHER PUBLICATIONS

European Search Report, European Application No. 16194531.6, Date of Mailing Mar. 15, 2017, European Patent Office; European Search Report 9 pages.

*Primary Examiner* — Rodney B White
(74) *Attorney, Agent, or Firm* — Cantor Colburn LLP

(57) ABSTRACT

A pressure control system for an aircraft seat includes a base plate and a plurality of cells attached to the base plate, each cell having a bellows and a top inflatable diaphragm and defines a pressure chamber therein. Charging apertures are formed in the base plate such that each cell has an associated charging aperture such that each charging aperture is in fluid communication with a pressure chamber. Discharging apertures are formed in the base plate such that each cell has an associated discharging aperture such that each discharging apertures is in fluid communication a pressure chamber. A charging valve and a discharging valve is in fluid communication with the pressure chambers and configured to supply or extract air to or from the chambers through the apertures. A pump is configured to supply pressurized air to the at least one charging valve.

19 Claims, 4 Drawing Sheets

(56) References Cited

U.S. PATENT DOCUMENTS

| | | | |
|---|---|---|---|
| 6,070,942 A * | 6/2000 | Barton | A47C 4/54 297/452.41 X |
| 6,092,249 A | 7/2000 | Karmen et al. | |
| 6,159,172 A * | 12/2000 | Gray | A61G 5/1043 297/452.41 |
| 6,212,719 B1 * | 4/2001 | Thomas | A47C 4/54 297/452.41 X |
| 6,240,951 B1 | 6/2001 | Yori | |
| 6,467,751 B1 | 10/2002 | Korpanty et al. | |
| 6,551,450 B1 * | 4/2003 | Thomas | A61H 9/0078 297/452.41 X |
| 6,671,911 B1 | 1/2004 | Hill et al. | |
| 7,278,179 B2 | 10/2007 | Schneider et al. | |
| 7,441,294 B2 * | 10/2008 | Mossbeck | A47C 27/082 297/452.41 |
| 7,758,121 B2 * | 7/2010 | Browne | B60R 7/043 297/452.41 |
| 7,996,940 B1 * | 8/2011 | Dahm | A47C 4/54 297/452.41 |
| 8,678,500 B2 * | 3/2014 | Lem | B60N 2/448 297/452.41 X |
| 2002/0017319 A1 | 2/2002 | Hintzman | |
| 2003/0038517 A1 * | 2/2003 | Moran | B60N 2/448 297/452.41 X |
| 2004/0160112 A1 | 8/2004 | Clapper | |
| 2005/0082895 A1 * | 4/2005 | Kimmig | A47C 7/467 297/452.41 |
| 2005/0177952 A1 | 8/2005 | Wilkinson et al. | |
| 2006/0217644 A1 | 9/2006 | Ozaki et al. | |
| 2010/0276541 A1 | 11/2010 | Boren et al. | |
| 2011/0227388 A1 * | 9/2011 | Bocsanyi | B60N 2/665 297/452.41 |
| 2014/0041127 A1 | 2/2014 | Codos | |
| 2014/0232155 A1 * | 8/2014 | Bocsanyi | A47C 4/54 297/452.41 X |

\* cited by examiner

PNEUMATIC COMFORT SEATS

CROSS REFERENCE TO RELATED APPLICATION

This application claims priority to Indian Patent Application No. 5654/CHE/2015 filed Oct. 20, 2015, the entire contents of which are incorporated herein by reference.

BACKGROUND

The subject matter disclosed herein generally relates to seats and, more particularly, to pneumatic comfort seats with bellows varying cell volume.

Seating comfort studies indicate that discomfort due to prolonged seating, e.g., in long haul flights, is greatly influenced by the pressure distribution at the user-seat interface, hereinafter "seating interface." Seating interface pressures and pressure distribution becomes uneven over time. Seats with air filled cushions, such as pneumatic cushions, have been successful in reducing the discomfort to the user by varying the seating cushion area to maintain uniform redistribution of interface pressures whenever required. The seating comfort is additionally influenced by the vibration levels experienced by the user. Even with such pneumatic seat cushions, user discomfort may exist, thus improved seating configurations may be desirable.

SUMMARY

A pressure control system for an aircraft seat is provided. The seat includes a base plate and a plurality of cells sealingly attached to the base plate, each cell of the plurality of cells having a bellows and a top inflatable diaphragm, wherein each cell defines a pressure chamber therein. A plurality of charging apertures are formed in the base plate such that each cell has at least one associated charging aperture, wherein each respective charging aperture is in fluid communication with a respective pressure chamber. A plurality of discharging apertures are formed in the base plate such that each cell has at least one associated discharging aperture, wherein each respective discharging apertures is in fluid communication with the respective pressure chamber. At least one charging valve is in fluid communication with the pressure chambers and configured to supply air to the chambers through the charging apertures. At least one discharging valve is in fluid communication with the pressure chambers and configured to expel air from the pressure chambers through the discharging apertures. A pump is configured to supply pressurized air to the at least one charging valve.

In addition to one or more of the features described above, or as an alternative, further embodiments of the seat may include that the at least one charging valve comprises a plurality of charging valves, and wherein each of the plurality of charging valves is configured in fluid communication with at least one of the pressure chambers of the plurality of cells.

In addition to one or more of the features described above, or as an alternative, further embodiments of the seat may include the at least one discharging valve comprises a plurality of discharging valves, and wherein each of the plurality of discharging valves is configured in fluid communication with at least one of the pressure chambers of the plurality of cells.

In addition to one or more of the features described above, or as an alternative, further embodiments of the seat may include the number of charging valves, the number of discharging valves, and the number of cells is equal.

In addition to one or more of the features described above, or as an alternative, further embodiments of the seat may include a storage chamber configured between the pump and the at least one charging valve, the storage chamber configured to be a pressure accumulator.

In addition to one or more of the features described above, or as an alternative, further embodiments of the seat may include that each top inflatable diaphragm is embedded in a cushion fabric of a seat.

In addition to one or more of the features described above, or as an alternative, further embodiments of the seat may include that the charging apertures are configured with diameters to control the airflow through the charging apertures.

In addition to one or more of the features described above, or as an alternative, further embodiments of the seat may include that the discharging apertures are configured with diameters to control the airflow through the discharging apertures.

In addition to one or more of the features described above, or as an alternative, further embodiments of the seat may include a control valve located between the pump and the at least one charging valve to control a flow of air between the pump and the at least one charging valve.

In addition to one or more of the features described above, or as an alternative, further embodiments of the seat may include that at least one of the at least one charging valve or the at least one discharging valve is a solenoid valve.

In accordance with another embodiment, a method for controlling the pressure in an aircraft seat having a plurality of cells is provided. The method includes pressurizing air and conveying it to at least one charging valve, controlling an airflow through the at least one charging valve to supply air into the plurality of cells, controlling an airflow out of the plurality of cells using at least one discharging valve, and exhausting air from the cells to decrease a pressure within the cells.

In addition to one or more of the features described above, or as an alternative, further embodiments of the method may include dampening pressure transients in a storage chamber prior to supplying air to the plurality of cells.

In addition to one or more of the features described above, or as an alternative, further embodiments of the method may include that the device is a pneumatic comfort cushion.

In addition to one or more of the features described above, or as an alternative, further embodiments of the method may include increasing a pressure in the plurality of cells by operation of the charging valves to increase a stiffness of the device.

In addition to one or more of the features described above, or as an alternative, further embodiments of the method may include decreasing a pressure in the plurality of cells by operation of the discharging valves to decrease a stiffness of the device.

In addition to one or more of the features described above, or as an alternative, further embodiments of the method may include that a seating profile is varied by the pressurizing and exhausting of the cells to vary a bellows height and radius of a top inflatable diaphragm of the cells.

Technical effects of embodiments of the present disclosure include a pressure control system configured to enable control of the comfort of a cushion. Further technical effects include providing a plurality of bellow air cells in the cushion, and controlling the pressure within the cells to enable a comfortable cushion to a user.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
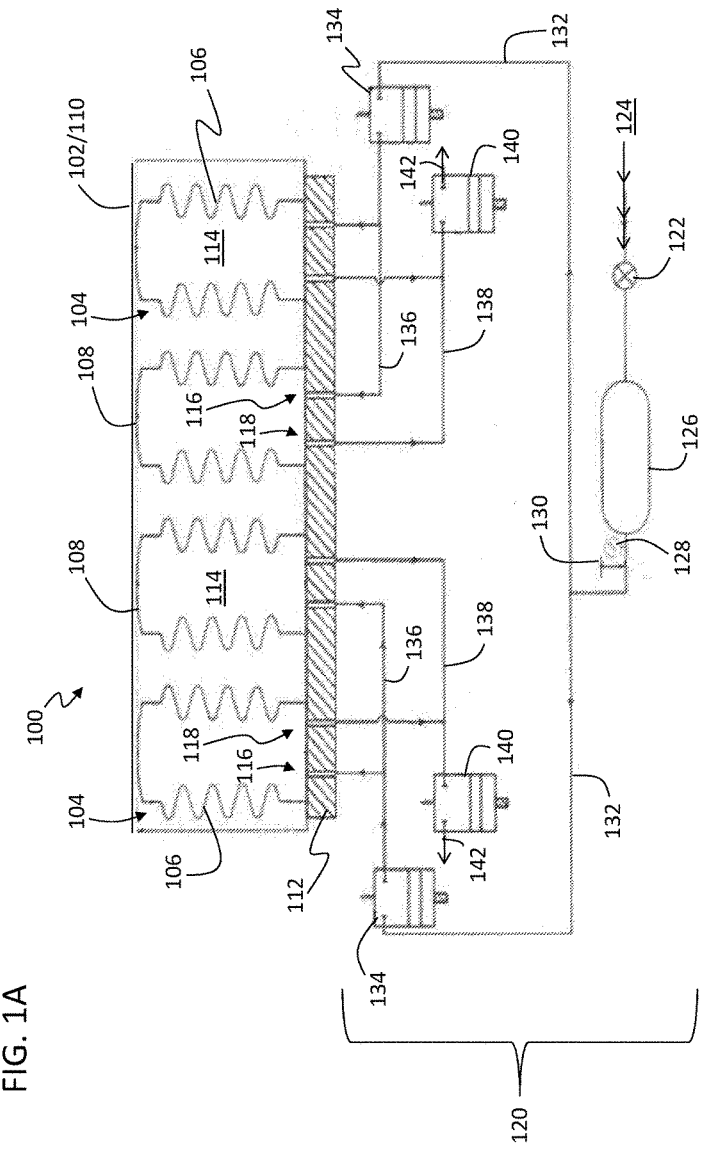
FIG. 1A is a schematic illustration of a pressure control system and pneumatic cushion in accordance with an embodiment of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein provide pneumatic cushions with air cells that are adjustable to vary the seating area or seating interface and/or the firmness of the seat by means of varying the cell height and radius of a top inflating surface on multiple pneumatic cells that form the seat. Air tight elastomeric bellows with top inflating fabric or an elastomeric diaphragm may be used to form individual pressure chambers or cells. The bellow bottom edge of the cells is joined to a base, such as a non-metallic base, to which fluid connectors configured to provide pressure charging and discharging into and out of each cell.

In operation, an increase in pneumatic pressure inflates the cell top layer surface to form a semi-sphere or dome shape. Further, increasing the pneumatic pressure may increase the rigidity or stiffness of the bellows of the cell, and further the height of the cell itself. This in turn changes the cell volume, the cushion stiffness, and the seating surface or interface, i.e., the seating area. Further, an increase in the seating contact area may increase the seating comfort by reducing the seat firmness, peak interface pressures, and/or hot spots experienced by the user. In some embodiments, as described herein, actuation or pneumatic pressure adjustment of the cells involves drawing ambient air using a motor operated vane pump and fast acting leak tight solenoid valves to provide pressure charging and/or discharging. The pressure of the pneumatic cushion cells, in some embodiments, may be adjustable by the user and may be varied with time.

In some embodiments, the bellows of the cells may be non-metallic. When formed as non-metallic bellows, the bellows may act as dampers to reduce or isolate vibration and/or shock levels experienced by a user. As will be appreciated by those of skill in the art, when non-metallic bellows are employed, inherent flexibility of the bellows may account for misalignments during installation of the cells when manufacturing a seat as described herein.

Further, as described herein, various embodiments may be customizable by mapping of cells, varying the cell area, varying the height and/or the stiffness, etc. For example, a seating profile formed by the seat and/or a stiffness of the seat may be varied by actuation of individual cells, by groups of cells, or by actuation of all of the cells that form a seat. In such configurations, pressure charging and discharging lines may be combined to allow grouping of cells. By grouping the cells of the seat, the cushion of the seat may be more flexible by permitting airflow between cells.

Figure 1B:
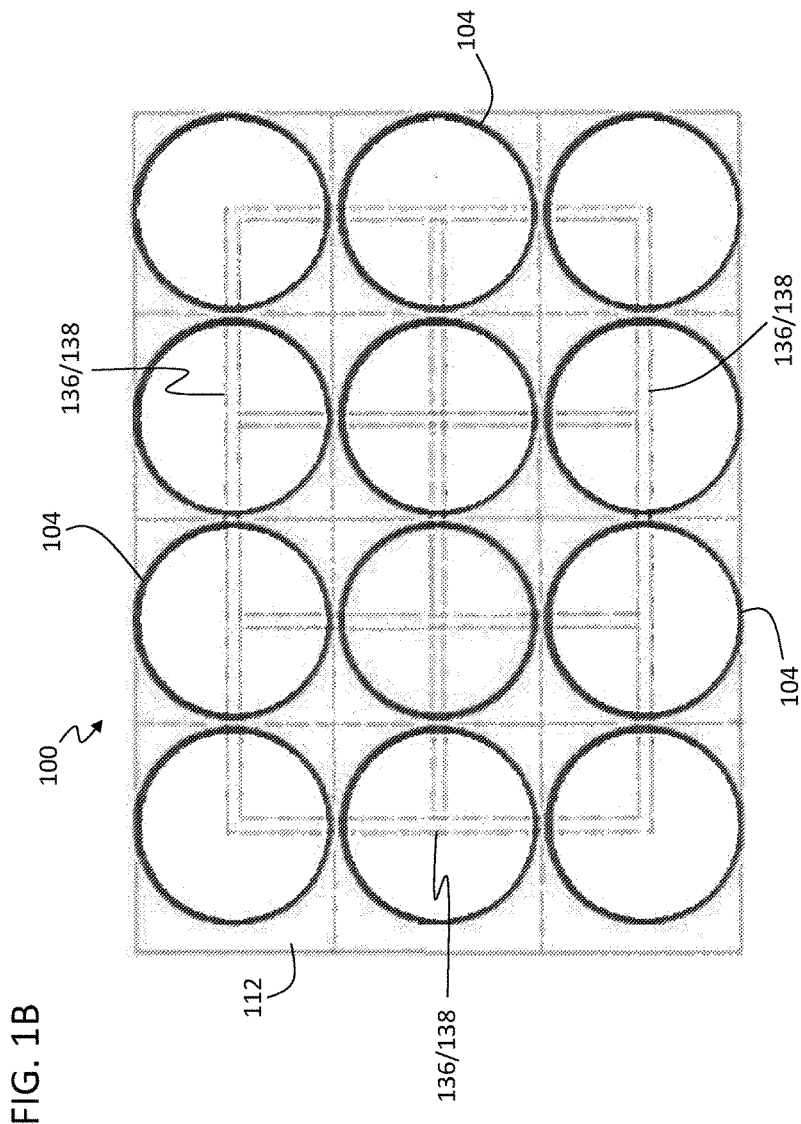
FIG. 1B is a plan view illustration of the cushion of FIG. 1A.

Turning now to FIGS. 1A and 1B schematic views of a seat cushion 100 in accordance with an embodiment of the present disclosure are shown. FIG. 1A is a side view schematic and FIG. 1B is a plan view schematic of the seat cushion 100. The seat cushion 100 has a seating interface 102. The seating interface 102 may be a fabric surface or top portion of the seat cushion 100. That is, the seating interface 102 is the surface of the seat cushion 100 upon which a user will have contact, and the seating interface 102 defines a contact surface with a user of the seat cushion 100. The seat cushion 100 may be configured as part of a seat having a backrest, arms rests, etc. as known in the art.

Below or underneath the seat interface 102 are a plurality of cells 104. Each of the cells 104 includes a bellows 106 and a diaphragm 108. The diaphragm 108 may be a top expansion surface and, in some embodiments, may be configured to engage with a fabric cushion 110 that a user may sit on, or may be embedded therein. In accordance with some embodiments, the diaphragm 108 may be formed from a fabric material, an elastic material, and/or an elastomeric material. Further, in accordance with some embodiments, the bellows 106 may be formed from an elastic or elastomeric material. In some embodiments, the bellows 106 and the diaphragm 108 may be formed from the same material. In some embodiments, the cells 104 may be made of resilient, air-tight, non-metallic convoluted circular bellows.

The cells 104 may be attached to a base plate 112. The bellows 106, the diaphragm 108, and a surface of the base plate 112 form a pressure chamber 114 within the cell 104. As such, the individual cells 104 may be sealed to form a pressure chamber within the cells 104. The pressure chambers 114 may be fluidly connected to a pressure control system 120 through charging apertures 116 and discharging apertures 118. The charging apertures 116 and the discharging apertures 118 may be holes or other fluid passages that fluidly connect the pressure chambers 114 to the pressure control system 120. In some embodiments, the base plate 112 may be formed from a non-metallic material and in other embodiments the base plate 112 may be metallic.

In the non-limiting embodiment shown in FIG. 1A, the pressure control system 120 includes a pump 122 to intake ambient air 124. The pump 122 may be a suction device configured to pull ambient air 124 into the pressure control system 120. In some embodiments, the pump 122 may be a vane pump. The ambient air 124 is then pumped into an option storage chamber 126. The storage chamber 126 may be configured as pressure accumulator or other device that may be used to pressurize the ambient air to a desired pressure. In an alternative embodiment, instead of ambient air 124, the pressure control system 120 may have a dedicated air or gas supply, such as stored air.

The air in the storage chamber 126 may then be controlled by a pressure gauge 128 and a control valve 130. The control valve 130 may be operably connected to the pressure gauge 128 such that a desired pressure may be maintained in the pressure control system 120 and/or in the pressure chambers 114 of the seat cushion 100. The air may then be supplied through an input line 132 to one or more charging valves 134. The charging valves 134 are fluidly connected to the pressure chambers 114 through charging lines 136 and charging apertures 116. Thus, air may be pumped into the pressure chambers 114 by operation of the pump 122, the control valve 130, and the charging valves 134. As shown, the embodiment includes two charging valves 134 each fluidly connected to two pressure chambers 114 and configured to pressurize or inflate the respective cells 104.

In some embodiments, the charging valves 134 may be fast acting, miniature solenoid valves. Application of pneumatic pressure through the charging valves 134 increases a radius of the diaphragm 108 and a height of the bellows 106. As the bellows 106 increases in height, the cell 104 may also increase in stiffness. Thus, the volume within the pressure chamber 114 of the cell 104 increases and the stiffness of the seating interface 102 may increase.

The pressure chambers 114 are also fluidly connected through the discharging apertures 118 and discharging lines 138 to discharging valves 140. The discharging valves 140 may be configured similar to the charging valves 134, but may be configured to enable extraction or exhaust of air from the pressure chambers 114. As such, vent air 142 may be exhausted from the pressure control system 120 by operation of the discharging valves 140. As air is discharged from the pressure chambers 114, the height of the cells 104 may decrease and so may the diaphragms 108 such that the stiffness of the seating interface 102 may decrease.

Turning now to FIG. 1B, a plan view of the seat cushion 100 is shown. As shown, the cells 104 form a grid on the base plate 112. Schematically shown are the charging lines 136 and the discharging lines 138 fluidly connected to each of the cells 104.

As noted, the pressure control system 120 may be configured in various configurations. For example, as shown in FIG. 1A, the pressure control system 120 shows one charging valve 134 and one discharging valve 140 for two cells 104. However, other configurations are possible. For example, in some embodiments, each cell 104 may have a dedicated charging valve 134 and a dedicated discharging valve 140. In other embodiments, each charging valve 134 and each discharging valve 140 may be fluidly connected to three or more cells 104. Further, the configuration may vary, such that some cells 104 have dedicated charging and discharging valves 134/140 and other cells 104 are grouped with shared charging and discharging valves 134/140.

Figure 2:
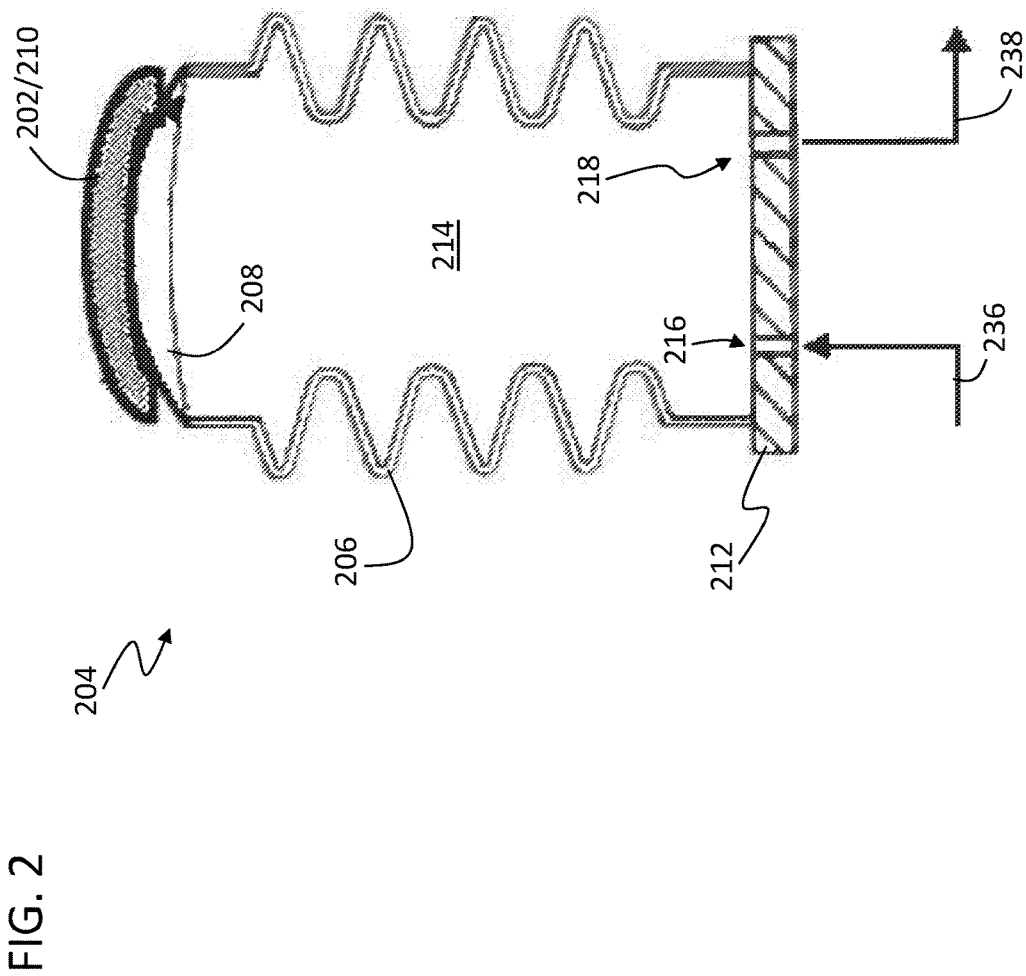
FIG. 2 is an enlarged schematic illustration of a cell in accordance with an embodiment of the present disclosure.

Turning now to FIG. 2, an enlarged view of a cell 204 in accordance with an embodiment of the present disclosure is shown. The cell 204 has a bellows construction, with a bellows 206 and a diaphragm 208 at a top thereof. The bottom of the bellows 206 is sealed and attached to a base plate 212. A pressure chamber 214 defined within the cell 204 is fluidly connected to a pressure control system through a charging aperture 216 and a discharging aperture 218, which are fluidly connected to a charging line 236 and a discharging line 238, respectively. The diaphragm 208 is attached to or embedded with a fabric cushion 210 of a seating interface 202, which forms a seat for a user to sit upon.

In accordance with embodiments described herein, a user may be able to adjust a seat to a comfortable level, e.g., pressure, stiffness, etc. Various configurations may be made within the scope of the present disclosure. For example, the spatial distribution and number of cells may be varied for specific seat configurations. Further, the cell area, e.g., the diameter of the diaphragm, and the bellow effective diameter may be configured to specific applications. Moreover, the material of the diaphragm, the base plate, and the bellows may be configured for different stiffness. Furthermore, the cell or bellow height may be adjusted or configured to desired results.

In some embodiments, the rate of charging and discharging of the cells from the pressure control system may controlled by the diameter of the charging and discharging apertures in the base plate. For example, larger diameter charging and discharging apertures may be used for higher flow rates, and smaller diameter charging and discharging apertures may be used for lower flow rates. Further, in some embodiments, the charging apertures may be larger diameter apertures to account for a user's weight pressing down on the seating interface, and the discharging apertures may be smaller diameter apertures for the same reason. Other variables in operation of the pressure charging system and seat cushion as described herein may include the user's weight, cell pressure, and operating duty cycle of the charging and discharging valves.

Figure 3:
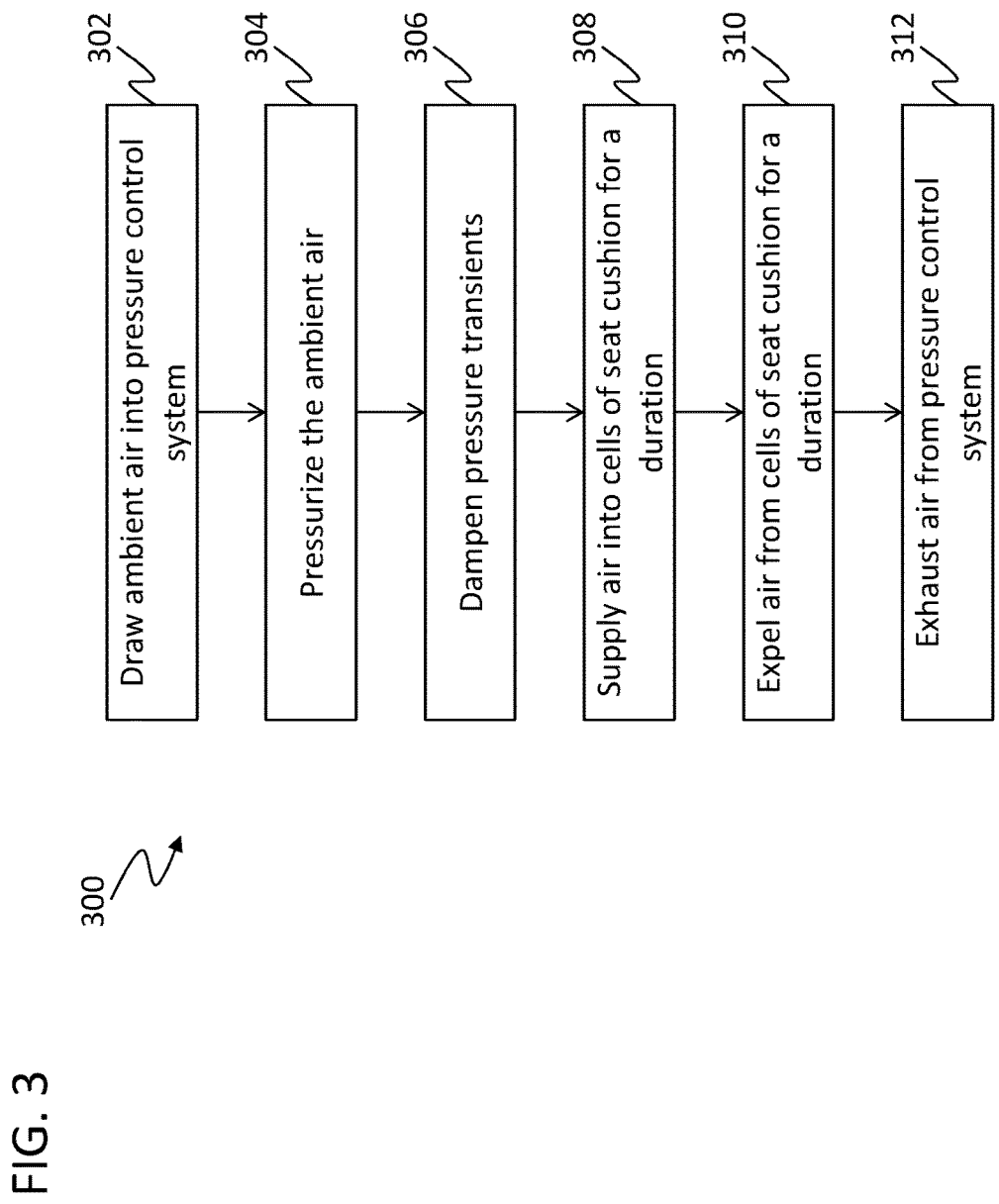
FIG. 3 is a flow process for adjusting the comfort of a seat cushion in accordance with an embodiment of the present disclosure.

Turning now to FIG. 3, a flow process 300 for adjusting the comfort of a seat cushion in accordance with an embodiment of the present disclosure is shown. With a user sitting on the seat cushion, comfort adjusting is achieved by drawing ambient air into the pressure control system, as shown at block 302. Next, the ambient is pressurized by a pump, as shown at block 304. Next, the pressurized air may be supplied into a storage chamber to dampen any pressure transients in the air, as shown at block 306.

The air may then be supplied through one or more charging valves and into one or more cells in a seat cushion for a desired or predetermined duration, as shown at block 308. The charging valves may be solenoid valves, which may enable fast reaction to a user adjusting the comfort of the seat cushion. Air may then be expelled from the cells for a desired or predetermined duration, as shown at block 310. Finally, the expelled air may then be exhausted from the system, as shown at block 312.

Advantageously, embodiments described herein provide a seat cushion and operation thereof employs an air-inflated cushion with a number of variable and elastomeric inflatable cells. A control valve and a pump are configured to draw in and pressurize ambient air. A seating profile of the seat cushion can vary by actuation of the cells of the seat cushion, thus adjusting the seating interface area and/or stiffness. Advantageously, one or more cells may be controlled individually or collectively, or in groups/subgroups thereof. The seating profile is varied by the pressure charging and discharging of the cells to vary a bellow height and a radius of a diaphragm of the cell. Seating cushions as disclosed herein may be highly customized by the design flexibility in configured the cells in terms of the number and orientation of the cells, and adjusting cell variables such as height, area, stiffness, etc.

Further, advantageously, in a group cell configuration, different cells of the groups may be configured to charge or discharge at different rates based on the charging and discharging apertures of the specific cells.

Furthermore, advantageously, embodiments disclosed herein enable vibration dampening, in addition to the seating comfort. That is, the cells being formed from non-metallic materials, the cells can act as dampers to reduce or isolate vibration and shock levels experienced by users of the seat cushions.

Moreover, advantageously, embodiments disclosed herein enable installation misalignments to not be an issue because of the adjustability of the individual cells. Moreover, manufacturing of cushion assemblies may be simplified as the construction involves mostly non-metallic materials with low pressure fluid joints. In some embodiments, the comfort adjustment may be manual by a user of the cushion, and in other embodiments, or in combination therewith, comfort adjustments may be preset or predetermined. For example, in some embodiments, the pressure control system may include a controller, such as connected to the pressure gauge that is configured to maintain and/or adjust a pressure within the pressure control system.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although described with the charging and discharging valves, those of skill in the art will appreciate that other types of valves may be used in combination or as alternatives. For example, in some embodiments, proportional flow control valves may be used to assist in maintain desired pressure levels in the system.

Moreover, although described herein with respect to a seat cushion, this is merely for simplicity of discussion and is not intended to be limiting. For example, pressure systems as described herein may be used for seats in aircraft, trains, automobiles, space craft, etc. and may further be used in medical applications, such as in a pulsating bellows configuration or for injured persons for body support or even in mattresses or other devices that people use to sit or lie on.

Accordingly, the present disclosure is not to be seen as limited by the foregoing description, but is only limited by the scope of the appended claims.

What is claimed is:

1. A pressure control system for an aircraft seat comprising:
   a base plate;
   a plurality of cells sealingly attached to the base plate, each cell of the plurality of cells having a bellows and a top inflatable diaphragm, wherein each cell defines a pressure chamber therein;
   a plurality of charging apertures formed in the base plate such that each cell has at least one associated charging aperture, wherein each respective charging aperture is in fluid communication with a respective pressure chamber;
   a plurality of discharging apertures formed in the base plate such that each cell has at least one associated discharging aperture, wherein each respective discharging apertures is in fluid communication with the respective pressure chamber;
   at least one charging valve in fluid communication with the pressure chambers and configured to supply air to the chambers through the charging apertures;
   at least one discharging valve in fluid communication with the pressure chambers and configured to expel air from the pressure chambers through the discharging apertures; and
   a pump configured to supply pressurized air to the at least one charging valve.

2. The pressure control system of claim 1, wherein the at least one charging valve comprises a plurality of charging valves, and wherein each of the plurality of charging valves is configured in fluid communication with at least one of the pressure chambers of the plurality of cells.

3. The pressure control system of claim 1, wherein the at least one discharging valve comprises a plurality of discharging valves, and wherein each of the plurality of discharging valves is configured in fluid communication with at least one of the pressure chambers of the plurality of cells.

4. The pressure control system of claim 1, wherein the number of charging valves, the number of discharging valves, and the number of cells is equal.

5. The pressure control system of claim 1, further comprising a storage chamber configured between the pump and the at least one charging valve, the storage chamber configured to be a pressure accumulator.

6. The pressure control system of claim 1, wherein each top inflatable diaphragm is embedded in a cushion fabric of a seat.

7. The pressure control system of claim 1, wherein the charging apertures are configured with diameters to control the airflow through the charging apertures.

8. The pressure control system of claim 1, wherein the discharging apertures are configured with diameters to control the airflow through the discharging apertures.

9. The pressure control system of claim 1, further comprising a control valve located between the pump and the at least one charging valve to control a flow of air between the pump and the at least one charging valve.

10. The pressure control system of claim 1, wherein at least one of the at least one charging valve or the at least one discharging valve is a solenoid valve.

11. A method for controlling the pressure in an aircraft seat having a plurality of cells, the method comprising:
   pressurizing air and conveying it to at least one charging valve;
   controlling an airflow through the at least one charging valve to supply air into the plurality of cells;
   controlling an airflow out of the plurality of cells using at least one discharging valve; and
   exhausting air from the cells to decrease a pressure within the cells; and
   dampening pressure transients in a storage chamber prior to supplying air to the plurality of cells.

12. The method of claim 11, wherein the device is a pneumatic comfort cushion.

13. The method of claim 11, further comprising increasing a pressure in the plurality of cells by operation of the charging valves to increase a stiffness of the device.

14. The method of claim 11, further comprising decreasing a pressure in the plurality of cells by operation of the discharging valves to decrease a stiffness of the device.

15. The method of claim 11, wherein a seating profile is varied by the pressurizing and exhausting of the cells to vary a bellows height and radius of a top inflatable diaphragm of the cells.

16. A method for controlling the pressure in an aircraft seat having a plurality of cells, the method comprising:
pressurizing air and conveying it to at least one charging valve using a pump;
controlling an airflow through the at least one charging valve to supply air into the plurality of cells, wherein plurality of cells are sealingly attached to a base plate, each cell of the plurality of cells having a bellows and a top inflatable diaphragm, wherein each cell defines a pressure chamber therein and a plurality of charging apertures are formed in the base plate such that each cell has at least one associated charging aperture, wherein each respective charging aperture is in fluid communication with a respective pressure chamber;
controlling an airflow out of the plurality of cells using at least one discharging valve; and
exhausting air from the cells to decrease a pressure within the plurality of cells.

17. The method of claim 16, further comprising increasing a pressure in the plurality of cells by operation of the charging valves to increase a stiffness of the device.

18. The method of claim 16, further comprising decreasing a pressure in the plurality of cells by operation of the discharging valves to decrease a stiffness of the device.

19. The method of claim 16, wherein a seating profile is varied by the pressurizing and exhausting of the cells to vary a bellows height and radius of a top inflatable diaphragm of the cells.

\* \* \* \* \*